United States Patent
Tien et al.

(10) Patent No.: US 7,522,395 B1
(45) Date of Patent: Apr. 21, 2009

(54) ELECTROSTATIC DISCHARGE AND ELECTRICAL OVERSTRESS PROTECTION CIRCUIT

(75) Inventors: Ta-Ke Tien, Cupertino, CA (US); Tar Hear Maung, Santa Clara, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 294 days.

(21) Appl. No.: 11/063,703

(22) Filed: Feb. 22, 2005

(51) Int. Cl.
*H02H 9/00* (2006.01)

(52) U.S. Cl. .................. 361/56; 361/91.1; 361/111

(58) Field of Classification Search .............. 361/56, 361/58, 91.1, 111
See application file for complete search history.

(56) References Cited

U.S. PATENT DOCUMENTS

| | | | |
|---|---|---|---|
| 5,086,365 A | | 2/1992 | Lien |
| 5,946,177 A | * | 8/1999 | Miller et al. ............ 361/56 |
| 6,014,305 A | * | 1/2000 | Yu ........................ 361/111 |
| 6,069,782 A | * | 5/2000 | Lien et al. ............. 361/111 |
| 6,278,162 B1 | | 8/2001 | Lien et al. |
| 6,339,344 B1 | * | 1/2002 | Sakata et al. .......... 326/83 |
| 6,430,016 B1 | * | 8/2002 | Marr ..................... 361/56 |
| 6,724,601 B2 | * | 4/2004 | Lien et al. ............. 361/111 |
| 7,102,862 B1 | * | 9/2006 | Lien et al. ............. 361/56 |
| 2002/0131221 A1 | * | 9/2002 | Lien et al. ............. 361/56 |
| 2004/0125521 A1 | * | 7/2004 | Salling et al. .......... 361/56 |
| 2004/0140849 A1 | * | 7/2004 | Ikeda .................... 330/110 |
| 2005/0099745 A1 | * | 5/2005 | Fischer et al. .......... 361/56 |
| 2005/0162791 A1 | * | 7/2005 | Ahmad et al. .......... 361/56 |
| 2006/0072258 A1 | * | 4/2006 | Poon et al. ............. 361/56 |

OTHER PUBLICATIONS

Horowitz, "The Art of Electronic", 2001, The Press Syndicate of the University of Cambridge, p. 9.*
Horowitz, "The Art of Electronics", 2001, The Press Syndicate of the University of Cambridge, p. 9.*

* cited by examiner

*Primary Examiner*—Stephen W Jackson
*Assistant Examiner*—Tien Mai
(74) *Attorney, Agent, or Firm*—Kenneth Glass; Glass & Associates

(57) ABSTRACT

Electrostatic discharge and electrical overstress protection circuit is disclosed to include a discharging circuit, a detection circuit and a controller. The controller is operable to sense and compare the output voltage from the detection circuit to a reference voltage. The controller, upon detection of a normal operating condition or an electrical overstress (EOS) situation, is operable to cause the discharging circuit to discharge any excess voltage from the voltage supply to the electrical ground at a safety voltage level. The controller, upon detection of an electrostatic discharge (ESD) event, is operable to cause the discharging circuit to discharge the excess voltage at a second voltage level that is less than the safety voltage level.

21 Claims, 6 Drawing Sheets

ELECTROSTATIC DISCHARGE AND ELECTRICAL OVERSTRESS PROTECTION CIRCUIT

FIELD OF THE INVENTION

The present invention relates generally to the field of integrated circuits. More specifically, the present invention relates to circuits for protecting integrated circuits from electrostatic discharge and electrical overstress.

BACKGROUND ART

Semiconductor integrated circuits are extremely susceptible to gate oxide breakdown caused by electrostatic discharge (ESD). This type of voltage sensitivity has resulted in on-chip electrostatic discharge protection for most semiconductor integrated circuits that use MOS technology. In addition to the electrostatic discharge problem, the susceptibility of semiconductor integrated circuits to electrical overstress (EOS) increases as the integrated circuit is scaled down to sub-micron feature size.

In one of the prior arts, an electrostatic discharge (ESD) protection circuit is disclosed to include protecting transistors configured to float the well and the gate of the protection transistor when no power supply potential (Vcc) is present. The protecting transistors are configured to couple the well and the gate of the protecting transistors to circuit ground (or the power supply potential) when the normal power supply potential (Vcc) is present. However, in this configuration, an ESD event can still cause permanent damage to the protection transistors when they are floating or when they are not connected to the power supply potential (Vcc). In addition, the ESD protection circuit of this prior art requires a large amount of space to implement in the semiconductor integrated circuits.

In another prior art, an integrated circuit having an electrostatic discharge (ESD) protection circuit including a core protection circuit, a sensitive core circuit and peripheral circuitry is disclosed. The core protection of the prior art is configured to disconnect the $V_{CC}$ voltage supply terminal from the $V_{DD}$ voltage supply terminal when the $V_{CC}$ voltage exceeds the nominal $V_{DD}$ supply voltage by a predetermined voltage amount. This ESD protection circuit is cumbersome and does not fully protect the sensitive core circuit from the electrostatic discharge event and the electrical overstress (EOS) because the predetermined voltage amount above the nominal supply voltage ($V_{DD}$) is fixed. Often, the voltage supply spikes in an electrostatic discharge (ESD) event are different from those in an electrical overstress (EOS) condition and they may occur on the $V_{DD}$ supply voltage.

Thus, there is a need for an electrostatic discharge (ESD) protection circuit that can discharge the excess electrostatic discharge (ESD) voltage to ground at a lower voltage than in the normal operating condition when the electrostatic event occurs so as to fully protect the integrated circuit from the ESD voltage and EOS events. Furthermore, there is a need in the art for an ESD protection that can be fabricated on the same chip with the integrated circuit to be protected.

SUMMARY OF THE INVENTION

The present invention provides an apparatus and method for protecting an Integrated Circuit (IC) from an electrostatic discharge (ESD) event and an electrical overstress (EOS) situation between a voltage supply ($V_{DD}$) and an electrical ground. The apparatus is disclosed to include a discharging circuit and a controller. The discharging circuit discharges excess voltage from the voltage supply ($V_{DD}$) to the electrical ground when an electrostatic discharge (ESD) event or an electrical overstress (EOS) event occurs. Whenever an electrostatic discharge (ESD) event occurs, the controller causes the discharging circuit to discharge excess voltage from the supply voltage ($V_{DD}$) to the electrical ground at a second voltage level adequately less than a predetermined safety voltage ($V_N$) in a normal operating condition or in the electrical overstress (EOS) condition to prevent the excess voltage from reaching a damaging level at the Integrated Circuit (IC).

A method for protecting an Integrated Circuit (IC) from an electrostatic discharge (ESD) event or an electrical overstress (EOS) condition is also disclosed that includes the steps of detecting an electrostatic discharge (ESD) voltage or an electrical overstress (EOS) situation. Whenever a normal operating condition or an electrical overstress (EOS) condition occurs, the step of providing a current path from a voltage supply ($V_{DD}$) to an electrical ground at a predetermined safety voltage level ($V_N$) is performed. Whenever an electrostatic discharge (ESD) event occurs, the step of discharging an ESD voltage from the voltage supply to the electrical ground at a second voltage level less than the predetermined safety voltage level ($V_N$) is performed to allow for a larger voltage supply margin in the electrical overstress (EOS) condition than in the electrostatic discharge (ESD) event.

These and other advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
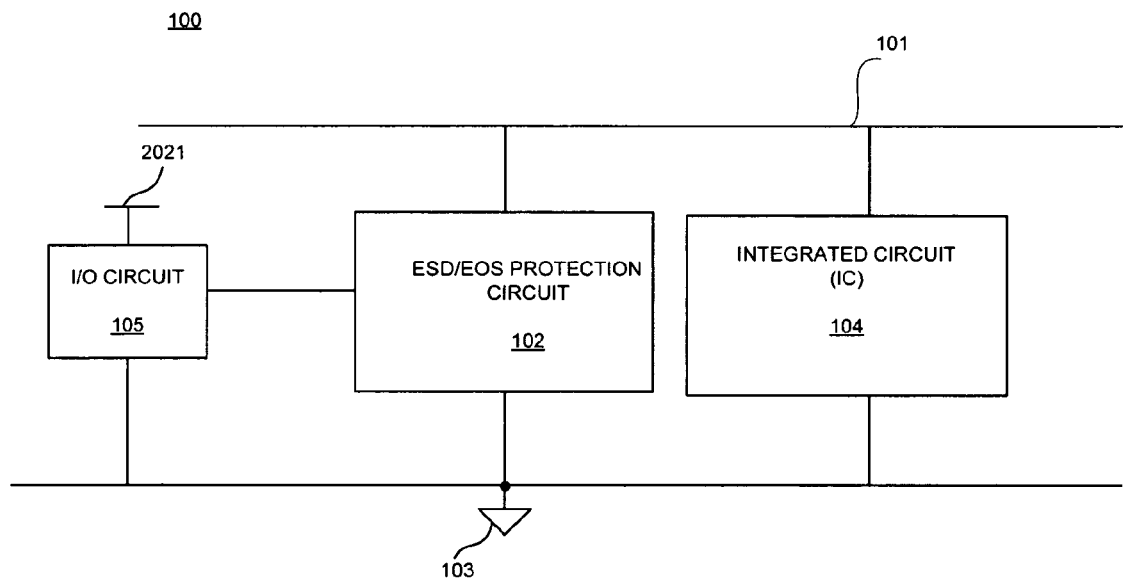
FIG. 1 illustrates a block diagram of a semiconductor system having an input/output (I/O) circuit, an Integrated Circuit (IC), and an electrostatic discharge (ESD)/electrical overstress (EOS) protection circuit in accordance with an embodiment of the present invention.

Referring to FIG. 1, a block diagram of a semiconductor system 100 is shown that includes an electrostatic discharge (ESD)/electrical overstress (EOS) protection circuit 102 coupled to an Integrated Circuit (IC) 104, and an input/output (I/O) circuit 105. Integrated Circuit (IC) 104 has a voltage supply ($V_{DD}$) 101 and an electrical ground 103. When an electrostatic discharge (ESD) event or an electrical overstress (EOS) occurs, ESD/EOS protection circuit 102 is operable to discharge the excess voltage from voltage supply ($V_{DD}$) 101 to electrical ground 103 to prevent the excess voltage from reaching a damaging level to Integrated Circuit (IC) 104. The discharging voltage of ESD/EOS protection circuit 102 in the ESD event is at a second voltage level adequately less than a predetermined safety voltage level ($V_N$) in the normal operating condition or in the electrical overstress (EOS) condition. The voltage supply margin in the electrostatic discharge (ESD) event is narrower than that in the electrical overstress (EOS) situation or in the normal operating condition. Thus, Integrated Circuit (IC) 104 is protected in both an electrical overstress (EOS) situation and in an electrostatic discharge (ESD) events.

The excess voltage caused by an electrostatic discharge (ESD) event or an electrical overstress (EOS) situation is a transient voltage supply ($V_{DD}$) noise spikes that can cause irreparable damage to the Integrated Circuit (IC) 104. In an electrical overstress (EOS) situation, semiconductor system 100 is allowed to operate in extended normal conditions so that Integrated Circuit (IC) 104 is subject to working past its electrical specifications and brought to its design margins. In such extended and overstress operating conditions, semiconductor system 100 is subject to voltage supply ripples that cause excess voltage. If exposed extensively to excess voltage caused by voltage supply ripples, Integrated Circuit (IC) 104 can be permanently damaged. The ESD/EOS protection circuit 102 in accordance with the present invention detects the electrical overstress (EOS) event and discharges the excess voltage from voltage supply ($V_{DD}$) 101 to electrical ground 103 at a safety voltage level ($V_N$). In an electrostatic discharge (ESD) event, this excess voltage is a single, fast, high current transfer of electrostatic charge that results from the transfer between semiconductor system 100 and another object at different electrical potentials. ESD/EOS protection circuit 102 detects an electrostatic discharge (ESD) event and discharges the excess voltage from voltage supply ($V_{DD}$) 101 to electrical ground 103 at a second voltage level, which is less than the safety voltage level ($V_N$). Thus, ESD/EOS protection circuit 102 is operable to create different voltage supply margins during an electrostatic discharge (ESD) event and during an electrical overstress (EOS) situation.

Referring again to FIG. 1, Integrated Circuit (IC) 104 is a thin gate core device. In one embodiment, Integrated Circuit (IC) 104 can be an SRAM cell that includes p-channel transistors (PMOS) and n-channel transistors (NMOS). As integrated circuits become more compact and faster in speed, the SRAM cell is fabricated using a CMOS logic process having minimum feature sizes of 0.18 microns or less. The gate oxide thickness of PMOS transistors is consequently made significantly smaller, or these transistors will be too slow to be used in the SRAM cell. PMOS transistors having such a small gate oxide thickness are extremely vulnerable to ESD/EOS voltage coupled directly to the voltage supply ($V_{DD}$) 101. Thus, as the electrostatic discharge (ESD) event or the electrical overstress (EOS) situation occurs, ESD/EOS protection circuit 102 preemptively dissipates excess current caused by excess voltage before a damaging voltage is developed across the PMOS transistors of the SRAM cell.

Figure 2:
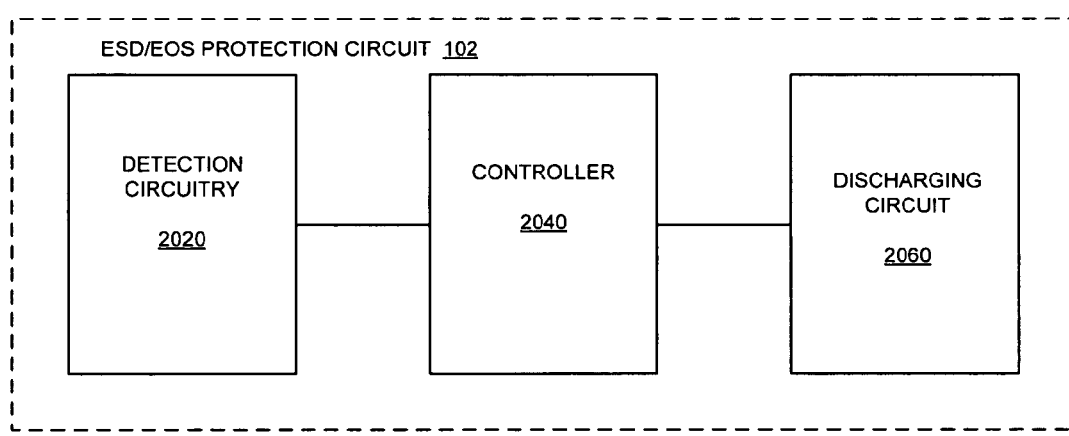
FIG. 2 illustrates structure of the electrostatic discharge (ESD)/EOS protection circuit of FIG. 1 that includes a detection circuitry, a controller, and a discharging circuit in accordance with an embodiment of the present invention.

ESD/EOS protection circuit 102 is operable to prevent large currents from flowing through Integrated Circuit (IC) 104 during ESD and EOS events by dissipating the excess voltage from voltage supply ($V_{DD}$) 101 to electrical ground 103. In the ESD event, the ESD/EOS protection circuit 102 dissipates excess voltage at a second voltage level adequately less than a predetermined safety voltage level ($V_N$) in the normal operating condition or in the electrical overstress (EOS) situation. As a consequence, the ESD/EOS voltage pulse does not have time to reach its maximum level and duration. FIG. 2 illustrates the structure of electrostatic discharge (ESD)/EOS protection circuit 102 of FIG. 1. ESD/EOS protection circuit 102 includes detection circuitry 2020, a controller 2040, and a discharging circuit 2060. Discharging circuit 2060 is electrically coupled between voltage supply ($V_{DD}$) 101 and electrical ground 103. Detection circuitry 2020 determines whether an electrostatic discharge (ESD) event, a normal operating condition or an electrical overstress (EOS) condition exists in Integrated Circuit (IC) 104. Detection circuitry 2020 produces an output voltage that rises with respect to a rising voltage on voltage supply ($V_{DD}$) 101 during a power-on. Controller 2040 is operable to receive the output voltage from detection circuitry 2020 and cause discharging circuit 2060 to discharge the excess voltage from voltage supply ($V_{DD}$) 101 to electrical ground 103. In an electrostatic discharge (ESD) event, controller 2040 is operable to cause discharging circuit 2060 to discharge at a second voltage level less than in the normal operating condition or in an electrical overstress (EOS) situation. Such preemptive discharge prevents the excess voltage from reaching its full voltage level and duration that would permanently damage Integrated Circuit (IC) 104. In addition, controller 2040 produces a minimal amount of static current of about 100 micro-amps (μA) during power-on as voltage in voltage supply ($V_{DD}$) 101 increasing from 0 volts to 1.5 volts.

Referring again to FIG. 1, input/output (I/O) circuit 105 is a thick gate device that provides a voltage source ($V_{DDQ}$) 2021 to detection circuitry 2020. In integrated circuits, the interface of signals between blocks with different voltage supplies can be achieved through I/O circuit 105. In one embodiment, I/O circuit 105 and Integrated Circuit (IC) 104 are a dual gate, dual power supply semiconductor device. I/O circuit 105 is a thick gate oxide input/output circuit with a voltage supply of about 2.5 volts. Integrated Circuit (IC) 104 is a thin gate oxide device with a 1.5 volt voltage supply. I/O circuit 105 has a voltage source or voltage supply ($V_{DD}$) 2021 that is detected by detection circuitry 2020. During normal operating conditions or during an electrical overstress (EOS)

situation, I/O circuit 105 is ON and its voltage source ($V_{DDQ}$) 2021 is 2.5 volts. In an electrostatic discharge (ESD) event, voltage source ($V_{DD}$) 2021 is floating at ground voltage or 0 volts. In one embodiment, I/O circuit 105 can be a test fixture designed to assimilate an electrostatic discharge (ESD) event and an electrical overstress (EOS) event during a burn-in process. In this configuration, I/O circuit 105 produces voltage source ($V_{DDQ}$) 2021 to ESD/EOS protection circuit 102 under test.

Figure 3:
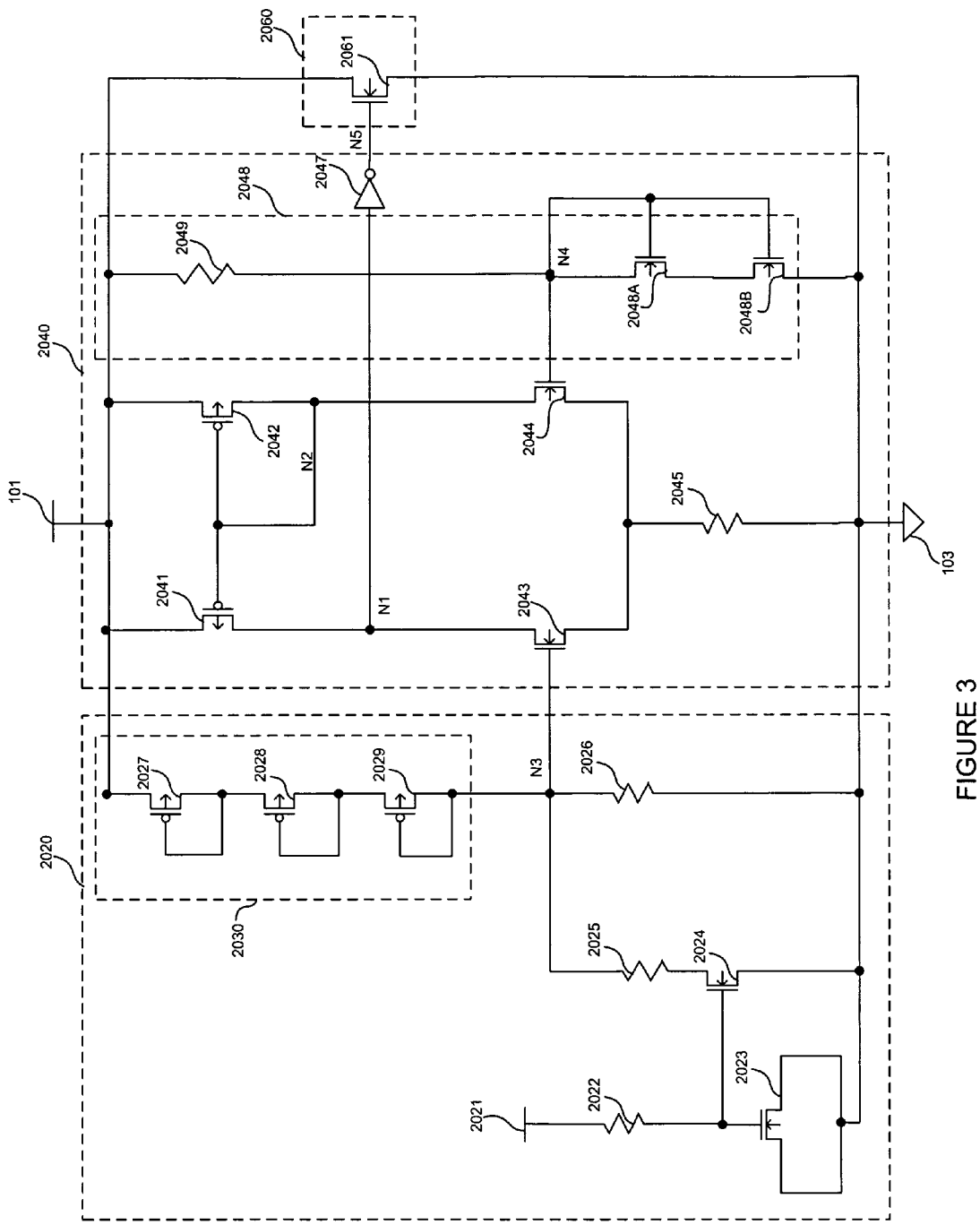
FIG. 3 shows the schematic diagram of the ESD/EOS protection circuit of FIG. 2 in accordance with an embodiment of the present invention.

FIG. 3 illustrates a schematic diagram of an electrostatic discharge (ESD)/electrical overstress (EOS) protection circuit 102 in accordance with the present invention. Detection circuitry 2020 receives voltage source ($V_{DDQ}$) 2021 from I/O circuit 105 and produces an output voltage that has a first detection level and a second detection level. The first detection level represents a normal operating condition or an electrical overstress (EOS) condition. The second detection level represents the occurrence of an electrostatic discharge (ESD) event between voltage supply ($V_{DD}$) 101 and electrical ground 103. These detection levels rise with respect to a rising voltage on the voltage supply during a power-on of Integrated Circuit (IC) 104. The second detection level rises at a higher rate than the first detection level. In one embodiment of the present invention, detection circuitry 2020 has an NMOS transistor 2024 electrically connected to voltage source ($V_{DDQ}$) 2021. Voltage source ($V_{DDQ}$) 2021 is electrically connected to a terminal of a first resistor 2022. The other terminal of first resistor 2022 is electrically connected to the gate of an NMOS transistor 2024 and to the gate of a capacitance 2023. In one embodiment, capacitance 2023 is an NMOS transistor having the drain and the source electrically connected together and to electrical ground 103. The drain of NMOS transistor 2024 is electrically connected to a terminal of a second resistor 2025. The other terminal of second resistor 2025 is electrically connected to a terminal of a third resistor 2026. The junction of third resistor 2026 and second resistor 2025 form node $N_3$ which is the output of detection circuitry 2020. The other terminal of third resistor 2026 is electrically connected to electrical ground 103.

Continuing with FIG. 3, detection circuitry 2020 also includes a clamping circuit 2030. The clamping circuit 2030 includes three PMOS transistors 2027-2029 electrically connected as diodes. Diodes 2027-2029 are electrically connected in series and to voltage supply ($V_{DD}$) 101. Each diode is formed by connecting the gate to the drain. The source of a first diode 2027 is electrically connected to voltage supply ($V_{DD}$) 101. The source of a second PMOS diode 2028 is electrically connected to the drain of first PMOS diode 2027, and the source of a third PMOS diode 2029 is electrically connected to the drain of second PMOS diode 2028. The drain of third diode PMOS 2029 is electrically connected to resistor 2025 and resistor 2026 at node $N_3$. The voltage at node $N_3$ is clamped at voltage supply ($V_{DD}$) 101 minus three threshold voltages of PMOS transistors 2027-2029, or $V_{DD} - 3V_{THP}$, which is the predetermined safety voltage level ($V_N$) for a normal operating condition or electrical overstress (EOS) situation. The predetermined safety voltage level ($V_N$) can be set to any voltage level, depending on Integrated Circuit (IC) 104.

Upon receiving the output signal from detection circuitry 2020, controller circuit 2040 adjusts an input to discharging circuit 2060. In the normal operating condition or in an electrical overstress (EOS) situation, controller 2040 adjusts the input of discharging circuit 2060 to cause discharging at a predetermined safety voltage level ($V_N$). However, in the occurrence of an electrostatic discharge (ESD) event, controller 2040 adjusts discharging circuit 2060 to discharge at a second voltage level adequately less than the predetermined safety voltage level ($V_N$). Thus, controller 2040 senses the voltage difference between an electrostatic discharge (ESD) event and a normal operating condition or electrical overstress (EOS) situation to produce different voltage supply margins. The voltage supply margin in an electrostatic discharge (ESD) event is smaller than that in a normal operating condition or electrical overstress (EOS) situation. In one embodiment, controller 2040 is a metal oxide semiconductor (MOS) transistor differential amplifier electrically connected to an inverter 2047. The differential amplifier has a first PMOS transistor 2041, a second PMOS transistor 2042, a first NMOS transistor 2043, and a second NMOS transistor 2044. The gate of first PMOS transistor 2041 is electrically connected to the gate of second PMOS transistor 2042. The source of first PMOS transistor 2041 and the source of second PMOS transistor 2042 are electrically connected to together and to supply voltage ($V_{DD}$) 101. The drain of first PMOS transistor 2041 is electrically connected to the drain of first NMOS transistor 2043 to form the output of the differential amplifier, denoted as node $N_1$. The output of differential amplifier is input to inverter 2047. The output of inverter 2047 forms the output of controller 2040.

In one embodiment, inverter 2047 is a large inverter having a pull-up PMOS transistor (not shown) electrically connected to a pull-down NMOS transistor (not shown). The width of the pull-up PMOS transistor is about 50 microns and the length is about 0.13 microns. The width of the pull-down NMOS transistor is 75 microns and its length is about 0.13 microns. Thus, inverter 2047 has a relatively fast switching time. Because the width of the pull-down NMOS transistor is larger than that of the pull-up PMOS transistor, inverter 2047 has faster pull-down speed. As a result, controller 2040 has better noise margins to turn on discharging circuit 2060 and to pull the excess voltage on voltage supply ($V_{DD}$) 101 down to electrical ground 103 in response to a logic low input signal at node $N_1$.

Continuing with FIG. 3, the drain of second PMOS transistor 2042 is electrically connected to the drain of second NMOS transistor 2044 and to the gate of first PMOS transistor 2041, forming node $N_2$. The sources of first NMOS transistor 2043 and second NMOS transistor 2044 are electrically connected together and to the first terminal of a resistor 2045. The second terminal of resistor 2045 is electrically connected to electrical ground 103. The gate of first NMOS transistor 2043 is electrically connected to the output voltage of the detection circuitry 2020 at node $N_3$. The gate of second NMOS transistor 2044 is electrically connected to a reference circuit 2048.

In the described embodiment, reference circuit 2048 provides a reference voltage ($V_{REF}$) to controller 2040 at node $N_4$. Reference circuit 2048 further includes a third NMOS transistor 2048A and a fourth NMOS transistor 2048B coupled together in series. The drain and the gate of third NMOS transistor 2048A are electrically connected together and to the gate of fourth NMOS transistor 2048B. The first terminal of a resistor 2049 is electrically connected to the drain of third NMOS transistor 2048A and the gate of fourth NMOS transistor 2048B to form an output of reference circuit 2048. This is denoted as node $N_4$ in FIG. 3. The other terminal of second resistor 2049 is electrically connected to supply voltage ($V_{DD}$) 101. The source of third NMOS transistor 2048A is electrically connected to the drain of fourth NMOS transistor 2048B. The source of fourth NMOS transistor 2048B is electrically connected to electrical ground 103. Reference voltage ($V_{REF}$) at node $N_4$ is equal to the threshold voltage of third NMOS transistor 2048A plus one drain to source voltage of fourth NMOS transistor 2048B ($V_{REF}=V_{THN}+V_{DS}$).

Continuing with FIG. 3, discharging circuit 2060 provides a current path from voltage supply ($V_{DD}$) 101 to electrical ground 103. Discharging circuit 2060 is an NMOS transistor 2061 having a drain electrically connected to supply voltage ($V_{DD}$) 101, the gate electrically connected to the output of inverter 2047 of controller 2040, and the source electrically connected to electrical ground 103. The NMOS transistor 2061 has a width similar to the other transistors in the controller circuit 2040. However, the length of NMOS transistor is longer than that of the other transistors so that it has a slow switching time. During power-on, when inverter 2047 receives a logic high input signal at node $N_5$, supply voltage ($V_{DD}$) 101 is allowed to rise slowly because NMOS transistor 2061 is a relatively small transistor in comparison to other NMOS transistors 2043-2044 in controller 2040. However, as inverter 2047 receives a logic low input signal, its large pull-down NMOS transistor causes discharging circuit 2060 to cease increasing with voltage supply ($V_{DD}$) 101 and to discharge excess current from voltage supply ($V_{DD}$) 101 to electrical ground 103.

In general, controller 2040 causes NMOS transistor 2061 of discharging circuit 2060 to turn on slowly during the power-on of Integrated Circuit (IC) 104. In addition, when an ESD event occurs on supply voltage ($V_{DD}$) 101, controller 2040 causes NMOS transistor of discharging circuit 2060 to turn on quickly at a voltage level less than the predetermined safety voltage level ($V_N=V_{DD}-3V_{THP}$) associated with a normal operating condition or in an electrical overstress (EOS) situation. If the voltage on the gate of first NMOS transistor 2043 is greater than the reference voltage ($V_{REF}$) at node $N_4$, then controller 2040 provides a logic low output signal to the input terminal of inverter 2047. Conversely, if the voltage on the gate of transistor 2043 is less than the reference voltage ($V_{REF}$) at node $N_4$, then controller 2040 provides a logic high output signal to the input terminal of inverter 2047 at node $N_1$.

Electrostatic discharge (ESD)/electrical overstress (EOS) protection circuit 102 operates as follows in accordance with one embodiment of the present invention. During power on of Integrated Circuit (IC) 104, voltage supply ($V_{DD}$) 101 increases from zero volts. Until voltage supply ($V_{DD}$) 101 reaches a voltage greater than three diode voltage drops of diodes 2027-2029 ($3V_{THP}$), NMOS transistors 2043-2044 are in cutoff state. As a result, the input of inverter 2047 at node $N_1$ increases with voltage supply ($V_{DD}$) 101. The output of inverter 2047 at node $N_5$ turns off NMOS transistor 2061. After voltage supply ($V_{DD}$) 101 becomes greater than three diode voltage drops, the voltage at node $N_3$ is equal to the predetermined safety voltage level ($V_N$), or voltage supply ($V_{DD}$) 101 minus three diode voltage drops ($V_{DD}-3V_{THP}$). Voltage at node $N_1$ has a logic low. In response, output of inverter 2047 is high, turning on discharging circuit 2060. As a result, a current discharging path is created from voltage supply ($V_{DD}$) 101 to electrical ground 103 as the voltage supply ($V_{DD}$) 101 reaches the predetermined safety voltage level ($V_N$). Thus, any voltage spikes in voltage supply ($V_{DD}$) 101 caused by electrical overstress (EOS) situation that is greater than safety voltage level ($V_N$) is discharged to electrical ground 103.

Figure 4A:
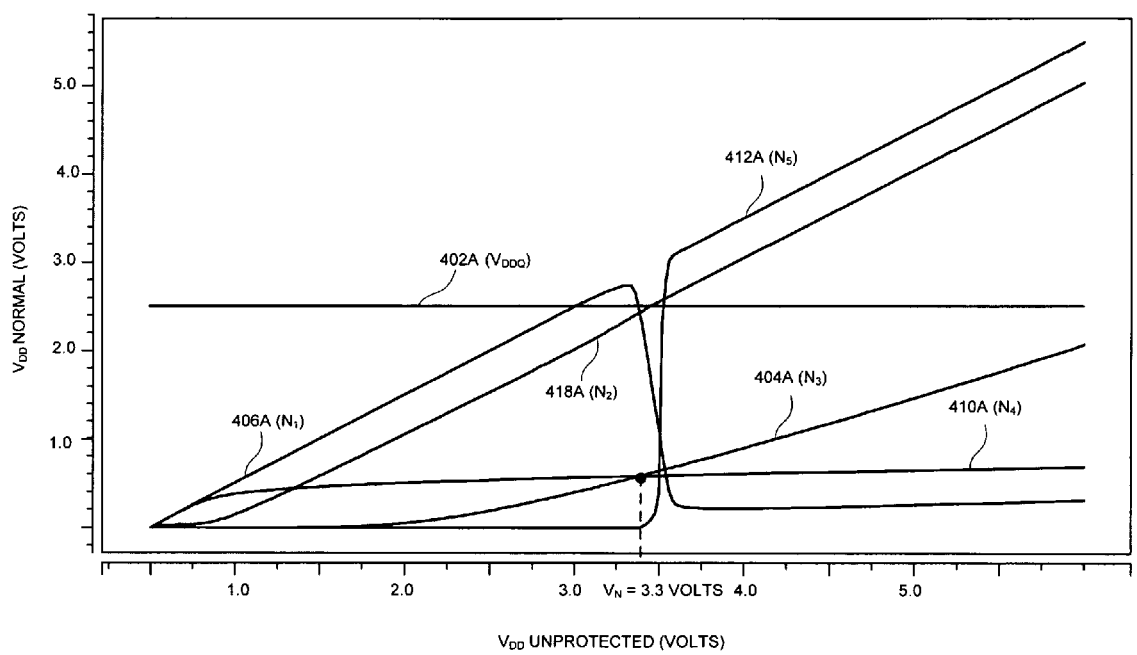
FIG. 4A illustrates the voltage responses at different nodes ($N_1$ to $N_5$) in the ESD/EOS protection circuit vs. the increasing voltage on the voltage supply during power-on in a normal operating condition or in an electrical overstress (EOS) in accordance with an embodiment of the present invention.

FIG. 4A illustrates the manner in which the electrostatic discharge (ESD) circuit 102 is operable to create a current discharging path from voltage supply ($V_{DD}$) 101 to electrical ground 103. FIG. 4A shows the graphs of the voltage responses of different nodes ($N_1$ to $N_5$) in electrostatic discharge (ESD)/electrical overstress (EOS) protection circuit 102 versus the rising voltage supply ($V_{DD}$) 101 during power-on.

During normal operation and during extensive burn-in processes that causes electrical overstress (EOS), voltage source ($V_{DDQ}$) 2021 is 2.5 Volts, represented by graph 402A. Reference voltage ($V_{REF}$) 2048 at node $N_4$, represented by graph 410A, is constant at about 0.4 volts during normal operating conditions or during electrical overstress (EOS). In response, NMOS transistor 2024 is on and pulls down the voltage at node $N_3$. Voltage response at node $N_3$ is rising with respect to a rising voltage supply ($V_{DD}$) 101 and represented by graph 404A. When the output voltage of detection circuitry 2020 at node $N_3$ applied to the gate of first NMOS transistor 2043 is less than reference voltage ($N_{REF}$), the voltage on the output terminal of controller 2040 at node $N_1$ is pulled up to a logic high voltage. In response, inverter 2047 provides a logic low signal to the gates of NMOS discharging transistor 2061, thereby graph 406A is high and graph 412A is low. In the described embodiment, resistor 2049 has a value of about 10 kilo-ohms (kΩ), and NMOS transistor 2061 is a relatively small transistor, having a width of about 10 microns and a length of about 0.13 microns. As a result, inverter 2047 is turned on slowly during power-on. The static current produced in controller 2040 during power on is advantageously limited to less than 150 micro-amps (μA). As the voltage supply ($V_{DD}$) 101 increases above and intersects graph of the reference voltage ($V_{REF}$) at voltage $V_N$, first NMOS transistor 2043 is turned on, pulling node $N_3$ to electrical ground 103. In response, the output to inverter 2047 at node $N_5$ provides high logic signal to NMOS transistor 2061 of discharging circuit 2060. As a result, NMOS transistor 2061 is turned on. Thus, graph 406A is pulled to electrical ground 103 and graph 412A is increasing after a predetermined safety voltage level ($V_N$). As a result, any voltage spikes in voltage supply ($V_{DD}$) 101, caused by electrical overstress (EOS) events that are greater than safety voltage level ($V_N$) are discharged to electrical ground 103.

Figure 4B:
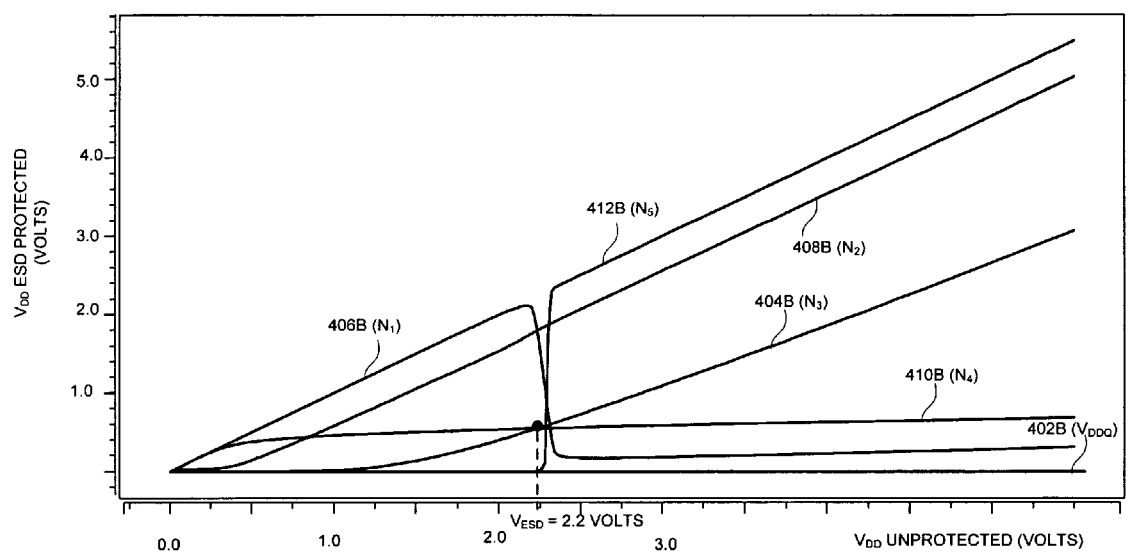
FIG. 4B illustrates the voltage responses at different nodes ($N_1$ to $N_5$) in the ESD/EOS protection circuit vs. the increasing voltage on the supply during power-on when an electrostatic discharge (ESD) event occurs ($V_{DDQ}$=0 volt) in accordance with an embodiment of the present invention.

Referring to FIG. 4B, when an ESD event occurs on voltage supply ($V_{DD}$) 101, voltage source ($V_{DDQ}$) 2021 of detection circuitry 2020 floats around zero volts as represented by graph 402B. As a result, NMOS transistor 2024 is cut-off, allowing voltage at node $N_3$ to rise as at a faster rate than in normal operating condition, thus crossing the reference voltage at a second voltage level $V_{ESD}$ adequately less than the predetermined safety voltage level ($V_N$) in the normal operating condition shown in FIG. 4A. The rising voltage at node $N_3$ is represented by graph 404B. Continuing with FIG. 4B, when the output voltage of detector circuitry 2020 at node $N_3$ applied to the gate of first NMOS transistor 2043 is less than reference voltage ($V_{REF}$), the voltage on the output terminal of controller 2040 at node $N_1$ is pulled up to a logic high voltage. In response, inverter 2047 provides a logic low signal to the gates of NMOS discharging transistor 2061, thereby graph 406B is high an graph 412B is low. As a result, inverter 2047 is turned on slowly during power-on, which is represented by graph 408B. As voltage supply ($V_{DD}$) 101 starts to cross over and increase above the reference voltage ($V_{REF}$), it intersects graph 410B at a second voltage level $V_{ESD}$. In response, first NMOS transistor 2043 is turned on, pulling node $N_3$ to electrical ground 103. In response, the output to inverter 2047 at node $N_5$ provides high logic signal to NMOS transistor 2061 of discharging circuit 2060. As a result, NMOS transistor 2061 is turned on. Thus, graph 406B is pulled down to electrical ground 103 and graph 412B is increasing after the second voltage $V_{ESD}$.

Thus, when an ESD event occurs on voltage supply ($V_{DD}$) 101, electrostatic discharge (ESD)/electrical overstress (EOS) protection circuit 102 is discharging ESD voltage from voltage supply ($V_{DD}$) 101 at the second voltage level ($V_{ESD}$) which is less than the predetermined safety voltage level ($V_N$) during normal operation or during burn-in of Integrated Circuit (IC) 104.

In the foregoing manner, electrostatic discharge (ESD)/ electrical overstress (EOS) protection circuit 102 provides protection for Integrated Circuit (IC) 104 both during electrostatic discharge (ESD) events and during normal/electrical overstress (EOS) operations.

Figure 5:
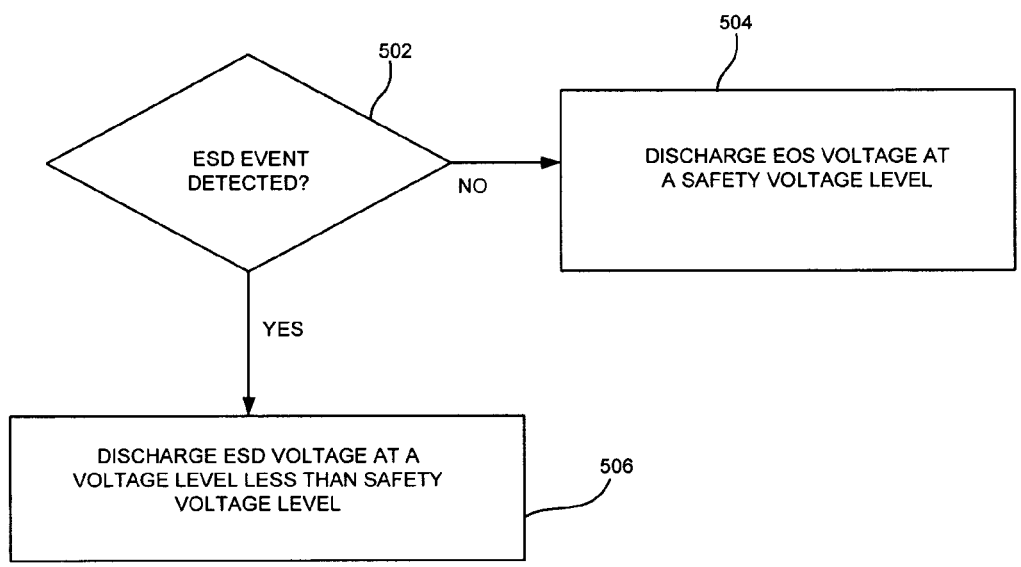
FIG. 5 shows a flow chart that illustrates a method for protecting an Integrated Circuit (IC) from electrostatic discharge (ESD) and electrical overstress (EOS) events that is supported by the ESD/EOS protection circuit of FIG. 3 in accordance with an embodiment of the present invention.

Referring to FIG. 5, a method 500 for protecting an Integrated Circuit (IC) from an electrostatic discharge (ESD)/ electrical overstress (EOS) event includes detecting whether an electrostatic discharge (ESD) event or an electrical overstress (EOS)/normal operating event has occurred. Whenever a normal operating condition or electrical overstress (EOS) occurs, controller 2040 creates a current discharging path from voltage supply ($V_{DD}$) 101 to electrical ground 103 at a predetermined safety voltage level ($V_N$). Whenever an electrostatic discharge (ESD) event occurs, controller 2040 causes discharging circuit 2060 to discharge the ESD voltage to electrical ground 103 at a second voltage level ($V_{ESD}$) adequately less than the predetermined safety voltage ($V_N$) in a normal operating condition to prevent the ESD voltage from reaching a damaging level to Integrated Circuit (IC) 104. Thus, the voltage supply margin in the case of an electrostatic discharge (ESD) event is narrower than that in the normal operating condition or in an electrical overstress (EOS) situation.

Referring to step 502, detecting an ESD event is accomplished by detection circuitry 2020 receiving voltage source ($V_{DDQ}$) 2021. During normal operation and during burn-in, voltage source ($V_{DDQ}$) 2021 is 2.5 Volts. In response, NMOS transistor 2025 is on and pulls down the voltage at node $N_3$. Voltage response at node $N_3$ is rising with respect to a rising voltage supply ($V_{DD}$) 101. When an ESD event occurs on voltage supply ($V_{DD}$) 101, voltage source ($V_{DDQ}$) 2021 of detection circuitry 2020 floats at zero volts. As a result, NMOS transistor 2024 is cut-off, allowing the voltage at node $N_3$ to rise as at a faster rate, thus crossing the reference voltage at a second voltage level $V_{ESD}$ earlier than $V_N$ in the normal operating condition or electrical overstress (EOS) situation.

Referring to step 504, a current discharging path from voltage supply ($V_{DD}$) 101 to electrical ground 103 is created at a predetermined safety voltage level ($V_N$) in a normal operating condition or in electrical overstress (EOS) situation. In a normal operating condition or in electrical overstress (EOS) situation, the voltage response of detection circuitry 2020 intersects a reference voltage ($V_{REF}$) at a predetermined safety voltage level ($V_N$). On or after voltage $V_N$, discharging circuit 2060 creates a current discharging path from voltage supply ($V_{DD}$) 101 to electrical ground 103.

Referring to step 506, the ESD voltage from voltage supply ($V_{DD}$) 101 to electrical ground 103 is discharged at a second voltage level ($V_{ESD}$) adequately less than the predetermined safety voltage ($V_N$) in a normal operating condition or in an electrical overstress (EOS) situation to prevent the ESD voltage from reaching a damaging level to Integrated Circuit (IC) 104. When an ESD event occurs, the voltage response of detection circuitry 2020 rises at a higher rate than that in the normal operating condition. Consequently, the voltage response of detection circuitry 2020 intersects a reference voltage ($V_{REF}$) at a second voltage level $V_{ESD}$ adequately less than the predetermined safety voltage level ($V_N$) in the normal operating condition. On or after voltage $V_{ESD}$, discharging circuit 2060 discharges the ESD voltage from voltage supply ($V_{DD}$) 101 to electrical ground 103.

In the present embodiment, the second voltage level $V_{ESD}$ is set at a voltage level that is less than the safety voltage level ($V_N$). More particularly, this can be accomplished by calculating a maximum voltage level that does not cause permanent damage to Integrated Circuit (IC) 104. Then, setting the safety voltage level ($V_N$) to this maximum voltage level by clamping voltage supply ($V_{DD}$) 101 to this maximum voltage level using diodes 2027-2029. Thus, the safety voltage level ($V_N$) depends on the type of Integrated Circuit (IC) 104 being protected. Using this method, with voltage supply ($V_{DD}$) 101 being 1.5 volts, the safety voltage level ($V_N$) is calculated to be 3.2 volts and the second voltage level $V_{ESD}$ is 2.2 volts. However, it can be understood that the second voltage level $V_{ESD}$ can be any voltage level that is less than the safety voltage level ($V_N$).

The present embodiment of the present invention is thus described. While the present invention has been described in particular embodiments, it should be appreciated that the present invention should not be construed as limited by such embodiments, but rather construed according to the following claims.

What is claimed is:

1. An electrostatic discharge (ESD)/electrical overstress (EOS) protection circuit electrically coupled to an Integrated Circuit (IC) having a voltage supply and an electrical ground, the protection circuit comprising:

a discharging circuit coupled between the voltage supply and the electrical ground;

a controller, coupled to the discharging circuit, the voltage supply, and the electrical ground, the controller operable in a normal operating condition or in an electrical overstress (EOS) situation to cause the discharging circuit to discharge any excess voltage above a safety voltage level, from the voltage supply to the electrical ground and the controller, upon the occurrence of an electrostatic discharge (ESD) event, to cause the discharging circuit to discharge the excess voltage above a second voltage level, from the voltage supply to the electrical ground, wherein the second voltage level is less than the safety voltage level; and a detection circuitry coupled to the discharging circuit, to the controller and to a voltage source, the detection circuitry providing an output voltage to the controller that rises with respect to a rising voltage on the voltage supply during a power-on of the Integrated Circuit (IC), wherein the output voltage rises at a higher rate during the ESD event than during the normal operating condition or the electrical overstress (EOS) situation in the Integrated Circuit (IC) and wherein the output voltage has a first detection voltage level associated with the normal operating condition or the electrical overstress (EOS) situation and a second detection voltage level associated with the electrostatic discharge (ESD) event, and wherein the detection circuitry further comprises an NMOS transistor having a gate, a drain and a source wherein the gate of the NMOS transistor electrically coupled to a first terminal of a first resistor, a second terminal of the first resistor electrically coupled to the voltage source, the drain of the NMOS transistor electrically coupled to a first terminal of a second resistor, a second terminal of the second resistor forming the output voltage and electrically coupled to the controller, the source of the NMOS transistor electrically coupled to the electrical ground, the gate of the NMOS transistor electrically coupled to a first terminal of a capacitor, a second terminal of the capacitor electrically coupled to the electrical ground.

2. The ESD/EOS protection circuit of claim 1 wherein the controller produces a static current of less than about 100 micro-amps as the voltage supply increases from about 0 volts to about 1.5 volts during a power-on.

3. The ESD/EOS protection circuit of claim 1 wherein the detection circuitry further comprises:
a clamping circuit electrically coupled to the detection circuitry and the voltage supply for clamping the voltage supply so that the output voltage cannot rise above the predetermined safety voltage level.

4. The ESD/EOS protection circuit of claim 1 wherein the capacitor comprises an NMOS transistor that includes a drain, a gate, and a source, the drain electrically coupled to the source to form the capacitor, the gate electrically coupled to the first terminal of the first resistor of the detection circuitry.

5. The ESD/EOS protection circuit of claim 1 further comprising an input/output (I/O) circuit operable to produce the voltage source.

6. The ESD/EOS protection circuit of claim 3 wherein the clamping circuit further comprises a plurality of PMOS transistors connected as diodes, the diodes electrically coupled to one another in series and coupled between the voltage supply and the output voltage of said detection circuitry.

7. The ESD/EOS protection circuit of claim 1 wherein the controller circuit further comprises a differential amplifier electrically coupled to an inverter, the differential amplifier having a first input terminal, a second input terminal, and an output terminal, first input terminal electrically coupled to receive the output voltage from the detection circuitry, the second input terminal electrically coupled to the reference voltage, the output terminal coupled to an input terminal of the inverter whose output terminal is electrically coupled to the discharging circuit.

8. The ESD/EOS protection circuit of claim 7 wherein the inverter comprises a Metal Oxide Semiconductor (MOS) inverter having a pull-up PMOS transistor and a pull-down NMOS transistor coupled in a series and between the voltage supply and the electrical ground.

9. The ESD/EOS protection circuit of claim 8 wherein the pull-up PMOS transistor has a width about 50 microns and a length about 0.13 microns and the pull-down NMOS transistor has a width about 75 microns and a length about 0.13 microns.

10. The ESD/EOS protection circuit of claim 7 wherein the differential amplifier further comprises:
a first PMOS transistor, a second PMOS transistor, a first NMOS transistor, and a second NMOS transistor, a gate of the first PMOS transistor electrically coupled to a gate of the second PMOS transistor, a sources of the first PMOS transistor and a source of the second PMOS transistor electrically coupled together and to the voltage supply, a drain of the first PMOS transistor electrically coupled to a drain of the first NMOS transistor and to the input terminal of the inverter, a drain of the second PMOS transistor electrically coupled to a drain of the second NMOS transistor and to the gate of the first PMOS transistor, a source of the first NMOS transistor and a source of the second NMOS transistor electrically coupled together and to a first terminal of a resistor, a second terminal of the resistor electrically coupled to the electrical ground, a gate of the first NMOS transistor electrically coupled to receive the output voltage from the detection circuitry, a gate of the second NMOS transistor electrically coupled to the reference voltage.

11. The ESD/EOS protection circuit of claim 10 wherein the controller further comprises a reference circuit, the reference circuit operable to provide the reference voltage to the controller, the reference circuit further comprising a third NMOS transistor connected as a diode, a fourth NMOS transistor, and a second resistor, a first terminal of the second resistor electrically coupled to the voltage supply, a second terminal of the second resistor electrically coupled to a gate of the third NMOS transistor and to a gate of the fourth NMOS transistor, a drain of the third NMOS transistor electrically coupled to the gate of the third NMOS transistor and to the gate of the fourth NMOS transistor, a source of the third NMOS transistor electrically coupled to a drain of the fourth NMOS transistor, and a source of the fourth NMOS transistor electrically coupled to the electrical ground.

12. The ESD/EOS protection circuit of claim 1 wherein the discharging circuit is an NMOS transistor having a gate coupled to the detector, a drain coupled to the supply voltage and a source coupled to the electrical ground.

13. The ESD/EOS protection circuit of claim 12 wherein the NMOS transistor has a width about 10 microns and a length about 0.13 microns.

14. A method for protecting an Integrated Circuit (IC) from an electrostatic discharge (ESD) event or an electrical overstress (EOS) situation comprising:
receiving a rising voltage on a voltage supply during a power-on of the Integrated circuit (IC);
providing an output voltage that rises with respect to the rising voltage on the voltage supply, wherein the output voltage rises at a, higher rate during the ESD event than during the normal operating condition or the electrical overstress (EOS) situation in the Integrated Circuit (IC) and wherein the output voltage has a first detection voltage level associated with the normal operating condition or the electrical overstress (EOS) condition and a second detection voltage level associated with the electrostatic discharge (ESD) event and wherein the output voltage is provided by a detection circuitry coupled to the voltage supply, the detection circuitry further comprising an NMOS transistor having a gate, a drain and a source wherein the gate of the NMOS transistor electrically coupled to a first terminal of a first resistor, a second terminal of the first resistor electrically coupled to the voltage supply, the drain of the NMOS transistor electrically coupled to a first terminal of a second resistor, a second terminal of the second resistor forming the output voltage and electrically coupled to the controller, the source of the NMOS transistor electrically coupled to an electrical ground, the gate of the NMOS transistor electrically coupled to a first terminal of a capacitor, a second terminal of the capacitor electrically coupled to the electrical ground
identifying whether the electrostatic discharge (ESD) event or the electrical overstress (EOS) situation has occurred on the supply voltage based on the output voltage provided, wherein the output voltage equal to the first detection voltage level indicates that the electrical overstress (EOS) or normal operating condition has occurred and wherein the output voltage equal to the second detection voltage level indicates that the electrostatic discharge (ESD) event has occurred;
discharging any excess supply voltage above a predetermined safety voltage level, from a voltage supply to an electrical ground during the identified electrical overstress (EOS) situation or a normal operating condition; and discharging the excess supply voltage above a second voltage level, from the voltage supply to the electrical ground during the identified electrostatic discharge (ESD) event, wherein the second voltage level is less than the predetermined safety voltage level.

15. The method of claim 14 wherein the step of discharging the excess voltage further comprises, producing a static current of less than about 100 micro-amps as the voltage supply increases from about 0 volts to about 1.5 volts during a power-on.

16. The method of claim 14 further comprising:
calculating a maximum voltage that causes no permanent damage to the Integrated Circuit (IC); and
setting the predetermined safety voltage level equal to the maximum voltage.

17. A semiconductor system comprising:
an Integrated Circuit (IC) coupled between a voltage supply and an electrical ground;
a discharging circuit coupled between the voltage supply and the electrical ground;
a controller, coupled to the discharging circuit, the voltage supply, and the electrical ground, the controller operable in a normal operating condition or in an electrical overstress (EOS) situation to cause the discharging circuit to discharge any excess voltage above a safety voltage level, from the voltage supply to the electrical ground, the controller, upon the occurrence of an electrostatic discharge (ESD) event, to cause the discharging circuit to discharge the excess voltage above a second voltage level, from the supply voltage to the electrical ground, wherein the second voltage level is less than the safety voltage level; and
a detection circuitry coupled to the discharging circuit, to the controller and to a voltage source, the detection circuitry providing an output voltage to the controller that rises with respect to a rising voltage on the voltage supply during a power-on of the Integrated Circuit (IC), wherein the output voltage rises at a higher rate during the ESD event than during the normal operating condition or the electrical overstress (EOS) situation in the Integrated Circuit (IC) and wherein the output voltage has a first detection voltage level associated with the normal operating condition or the electrical overstress (EOS) situation and a second detection voltage level associated with the electrostatic discharge (ESD) event, and wherein the detection circuitry further comprises an NMOS transistor having a gate, a drain and a source wherein the gate of the NMOS transistor electrically coupled to a first terminal of a first resistor, a second terminal of the first resistor electrically coupled to the voltage source, the drain of the NMOS transistor electrically coupled to a first terminal of a second resistor, a second terminal of the second resistor forming the output voltage and electrically coupled to the controller, the source of the NMOS transistor electrically coupled to the electrical ground, the gate of the NMOS transistor electrically coupled to a first terminal of a capacitor, a second terminal of the capacitor electrically coupled to the electrical ground.

18. The semiconductor system of claim 17 wherein the controller produces a static current of less than about 100 micro-amps as the voltage supply increases from about 0 volts to about 1.5 volts during a power-on.

19. The semiconductor system of claim 18 wherein the Integrated Circuit (IC) comprises an array of thin gate memory cells.

20. The semiconductor system of claim 19 wherein the memory cells are transistor static random access memory cells (SRAM).

21. An electrostatic discharge (ESD)/electrical overstress (EOS) protection circuit electrically coupled to an Integrated Circuit (IC) having a supply voltage and an electrical ground, comprising:
discharging means coupled between the voltage supply and the electrical ground;
controlling means, coupled to the discharging means, the voltage supply, and the electrical ground, the controlling means operable in a normal operating condition or in an electrical overstress (EOS) situation to cause the discharging circuit to discharge any excess voltage above a safety voltage level, from the voltage supply to the electrical ground the controller, upon the occurrence of an electrostatic discharge (ESD) event, to cause the discharging circuit to discharge the excess voltage above a second voltage level, from the supply voltage to the electrical ground, wherein the second voltage level is less than the safety voltage level; and
detection means coupled to the discharging means, to the controlling means and to a voltage source, the detection means providing an output voltage to the controlling means that rises with respect to a rising voltage on the voltage supply during a power-on of the Integrated Circuit (IC), wherein the output voltage rises at a higher rate during the ESD event than during the normal operating condition, or the electrical overstress (EOS) situation in the Integrated Circuit (IC) and wherein the output voltage has a first detection voltage level associated with the normal operating condition or the electrical overstress (EOS) situation and a second detection level associated with the electrostatic discharge (ESD) event, and wherein the detection means further comprising an NMOS transistor having a gate, a drain and a source wherein the gate of the NMOS transistor electrically coupled to a first terminal of a first resistor, a second terminal of the first resistor electrically coupled to the voltage source, the drain of the NMOS transistor electrically coupled to a first terminal of a second resistor, a second terminal of the second resistor forming the output voltage and electrically coupled to the controller, the source of the NMOS transistor electrically coupled to the electrical ground, the gate of the NMOS transistor electrically coupled to a first terminal of a capacitor, a second terminal of the capacitor electrically coupled to the electrical ground.

* * * * *